Patented Dec. 30, 1930

1,787,101

UNITED STATES PATENT OFFICE

FRANCIS HERBERT BRAMWELL, OF LONDON, ENGLAND, ASSIGNOR TO IMPERIAL CHEMICAL INDUSTRIES LIMITED, OF LONDON, ENGLAND, A BRITISH COMPANY

LINING VESSELS FOR CARRYING OUT OPERATIONS WITH LIQUIDS AND THE LIKE

Application filed January 10, 1930, Serial No. 419,917, and in Great Britain January 9, 1929.

This invention relates to the construction of vessels intended to be lined with a protective lining against the action of corrosive substances. Such vessels are commonly used in the chemical industries for evaporating liquids effecting chemical reactions in liquids, and similar purposes. The vessel is usually made of a corrodible material, such as iron or steel, and the protective lining is applied to the surfaces exposed to attack. The principal object of the present invention is to provide a vessel such that a lining can be affixed which is free from any mechanical tendency to come apart from the surface to which it is applied. A common defect of lead-lined or rubber-lined vessels for example is the tendency for the lining to become detached from the vessel owing to the presence of air-pockets that have become trapped under the lining during the process of application, or in the case of rubber lining gases may be evolved from the rubber or fixing solution. These pockets form centres from which the lining starts to peel off after the vessel has been in use for a time.

According to the invention a double-walled vessel is provided and the inner shell to which the lining is applied is perforated with a large number of small holes, the space between the walls being partially evacuated so that any gas trapped under the lining will be sucked away into the surrounding jacket.

In one construction the outer walls and the inner shell are riveted together with rivets having distance pieces on their shanks and counter-sunk heads on the inner side. The lining, e. g. lead or rubber, is applied to the inner shell and over the countersunk rivet heads.

If the vessel is to be used under reduced pressure, as in an evaporator for example, it is advantageous to connect the vacuum engine to the space between the walls. In this way the lining is not subjected to any pressure difference that might cause detachment.

The invention is illustrated in the accompanying drawing.

Figure 1:
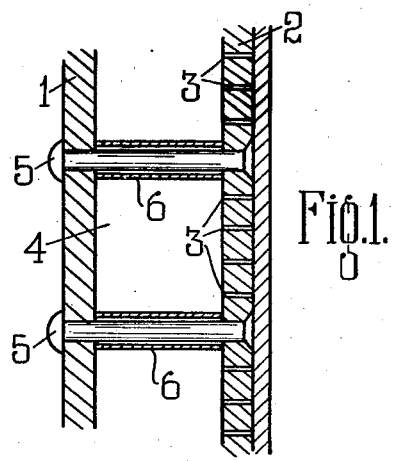
Fig. 1 is an enlarged detailed view in section of a portion of the walls of a vessel embodying this invention.
Figure 2:
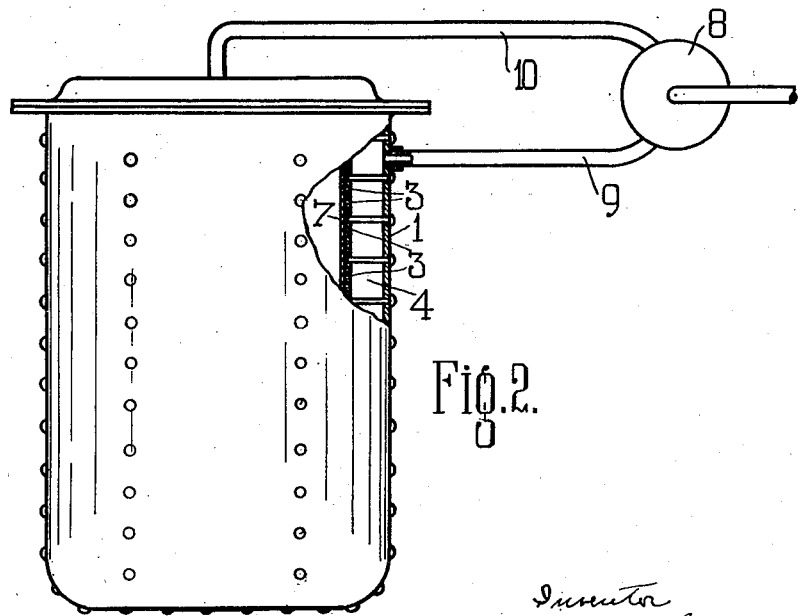
Fig. 2 is a side view partly in section of apparatus embodying this invention.

Here 1 is a vessel, with an inner wall 2 perforated at 3, and leaving a space 4 between the outer and inner walls. Countersunk rivets 5 are provided with spaces 6 and connect the outer and inner walls. 7 is the lining. The space 4 is connected to the vacuum engine 8 by a pipe 9 and a pipe 10 connects the vessel to the same vacuum engine.

I declare that what I claim is:—

1. An apparatus for carrying out operations with corrosive liquids comprising a double walled vessel, the inner wall of which is perforated with a large number of small holes, a non-corrodible relatively soft lining to the inner wall, and a source of low pressure connected to the space between the walls.

2. An apparatus as set forth in claim 1 in which the non-corrodible lining is made of rubber.

3. An apparatus as set forth in claim 1 in which the non-corrodible lining is made of lead.

4. An apparatus for carrying out operations with corrosive liquids under reduced pressure, comprising a closed double-walled vessel, the inner wall of which is perforated with a large number of small holes, a non-corrodible relatively soft lining to the inner wall, a source of vacuum, a connection from said source to the interior of said vessel, and a connection from said source to the space between the walls.

5. An apparatus for carrying out operations with corrosive liquids comprising a double-walled vessel, the inner wall of which is perforated with a large number of small holes, countersunk rivets connecting said inner wall and the outer wall, spacers on said rivets, a non-corrodible lining of relatively soft material to the inner wall, and a source of low pressure connected to the space between the walls.

6. An apparatus for carrying out operations with corrosive liquids comprising a double-walled vessel, the inner wall of which is perforated with a large number of small holes, and a non-corrodible lining to said inner wall, made of a relatively soft material.

7. A container for corrosive substances, said container having spaced walls, the inner wall being perforated and having a non-corrodible lining.

In witness whereof, I have hereunto signed my name.

FRANCIS HERBERT BRAMWELL.